(12) United States Patent
Lin et al.

(10) Patent No.: US 6,834,124 B1
(45) Date of Patent: Dec. 21, 2004

(54) ADAPTIVE IMAGE ENHANCEMENT FILTER

(75) Inventors: Ying-wei Lin, Penfield, NY (US); Robert P. Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 600 days.

(21) Appl. No.: 09/687,111

(22) Filed: Oct. 16, 2000

(51) Int. Cl.[7] .................................................. G06K 9/40
(52) U.S. Cl. ........................ 382/261; 382/266; 358/1.9; 358/3.27
(58) Field of Search .................. 382/260, 261, 382/266, 254, 256; 333/156–212; 359/885–892; 455/213, 286, 307, 339; 708/300; 348/606, 610, 619–624; 358/1.2, 1.9, 3.27, 3.24

(56) References Cited

U.S. PATENT DOCUMENTS

| | | | |
|---|---|---|---|
| 4,437,122 A | 3/1984 | Walsh et al. | 358/166 |
| 4,847,641 A | 7/1989 | Tung | 346/154 |
| 5,005,139 A | 4/1991 | Tung | 364/519 |
| 5,134,495 A | 7/1992 | Frazier et al. | 358/298 |
| 5,390,263 A | 2/1995 | Guay et al. | 382/50 |
| 5,515,480 A | 5/1996 | Frazier | 395/109 |
| 5,539,866 A | 7/1996 | Banton et al. | 395/117 |
| 5,553,171 A * | 9/1996 | Lin et al. | 382/299 |
| 5,742,703 A | 4/1998 | Lin et al. | 382/176 |
| 6,285,463 B1 * | 9/2001 | Lin et al. | 358/1.9 |
| 6,356,654 B1 * | 3/2002 | Loce et al. | 382/162 |
| 6,381,372 B1 * | 4/2002 | Loce | 382/261 |
| 6,449,396 B1 * | 9/2002 | Loce et al. | 382/276 |

* cited by examiner

Primary Examiner—Samir Ahmed
(74) Attorney, Agent, or Firm—William Eipert

(57) ABSTRACT

An adaptive image enhancement filter includes a template matching module for comparing an observed pixel pattern comprising a target pixel and one or more neighboring pixels to a set of templates to determine if the observed pixel pattern matches any of the templates. The template matching module generates a match identifier signal indicating which of the templates, if any, the observed pixel pattern is found to match. Based on this match identifier, a signal generation module provides an enhanced output signal for the target pixel. The template matching and/or the signal generation modules can be independently modified to adapt to changing conditions as identified by signals identifying image attributes and marking process attributes.

16 Claims, 6 Drawing Sheets

ADAPTIVE IMAGE ENHANCEMENT FILTER

BACKGROUND OF THE INVENTION

The present invention generally relates to a method and apparatus to improve the appearance of images produced by an output device. More particularly, the present invention is directed to an adaptive image enhancement filter for generating enhanced print data to drive an image output terminal.

A common goal in the development of image output systems is improving image quality. One method of achieving improved image quality in digital image output systems is through the use of image enhancement filters. Image enhancement filters can be used to perform a variety of image processing operations including resolution conversion, enhancement, rotation, restoration, appearance matching or tuning, and de-screening for both binary and grayscale images.

Image enhancement filters frequently are achieved using template-based or template-matching filters which are implemented using look-up tables due to their design versatility and ease of implementation and use. Each filter includes a number of template operators, or simply templates, to filter or transform an input image into an enhanced output image by, in a typical image processing setting, transforming certain observed pixel patterns in the input image into corresponding enhanced pixel patterns. Specifically, the filter receives an arrangement of pixels identified by a window of predetermined size and shape defining a set of pixels located about a target pixel. The enhancement filter compares the received pixel pattern defined by the window to one or more templates to determine if there is a match. If a match to the observed pixel pattern is found, the filter generates an appropriate output signal such as an enhanced pixel pattern for the target pixel. This output signal can be used to drive the image output device or be used as an input to further image processing operations. To process a given region of an image, the window is typically scanned across an image advancing from target pixel to target pixel in a predetermined sequence.

The design of an image enhancement filter for generating an enhanced output signal to drive an image output device requires the identification of the image structures that should be enhanced as well as knowledge of the marking process characteristics. Identification of the image structures that should be enhanced enables a determination of the matching templates required for the filter. Knowledge of the marking process and its characteristics is essential for the development of an image enhancement filter. The signals employed to drive an image output terminal as well as the marking process used to generate the output image have an effect within the output image that may be thought of as the amount darkness generated, the resulting shift in an edge, the resulting line thickness, or the resulting pixel density. The possible output signals can be calibrated so as to characterize the effect they generate, and then, knowing their effect, an appropriate signal can be identified for each image structure setting.

Typically, image enhancement filters are designed to output a specific enhanced signal for each one of a predetermined set of templates. While such image enhancement filters have proven to be a very effective tool for improving image quality, existing methods and devices for implementing the filters often suffer from one or more drawbacks which may limit their effectiveness in some applications. One such drawback of conventional image enhancement filters is the inability to easily or automatically adapt the filter for marking processes with varying characteristics. Consider, for example, an image enhancement filter for generating an enhanced image signal for driving an image output terminal. As described above, the enhanced signal for a given template will be based, in large part, on the characteristics of the marking process. Any variations in the marking process or the process characteristics may have an impact on the enhanced signal needed to accurately reproduce the input image. However, existing image enhancement filters do not permit these variations in the marking process characteristics to be addressed without loading and implementing a new filter.

SUMMARY OF THE INVENTION

One aspect of the present invention is an adaptive image enhancement filter for receiving image data including a plurality of pixels and generating enhanced image data for driving a marking engine for each pixel within the image data. The adaptive image enhancement filter includes a template matching processor that receives an observation pattern including a target pixel and at least one pixel neighboring the target pixel. The template matching module compares the received observation pattern to a set of templates and generates a match identification signal. A signal generation processor connected to receive the match identification signal and a marking process attribute signal identifies a set of optimized drive signals in response to the marking engine attribute signal and in response to the received match identifier provides optimized drive signals from the identified set of drive signals as the enhanced image data for the target pixel.

Another aspect of the present invention is a method of generating enhanced image data for driving a marking engine. The method includes the steps of (a) receiving a set of pixels to be printed, the set of pixels including an observation window identifying a target pixel and at least one neighboring pixel; (b) comparing the pixels within the observation window to a set of pixel templates; (c) generating a template match identifier in response to the comparing step; (d) selecting one of a plurality of sets of optimized drive signals, each set of optimized drive signals containing a plurality enhanced signals for driving the marking engine; and (e) using the match identifier select one of enhanced signals from the selected set of optimized drive signals as the enhanced image data.

DESCRIPTION OF THE PREFERRED EMBODIMENT

Figure 1:
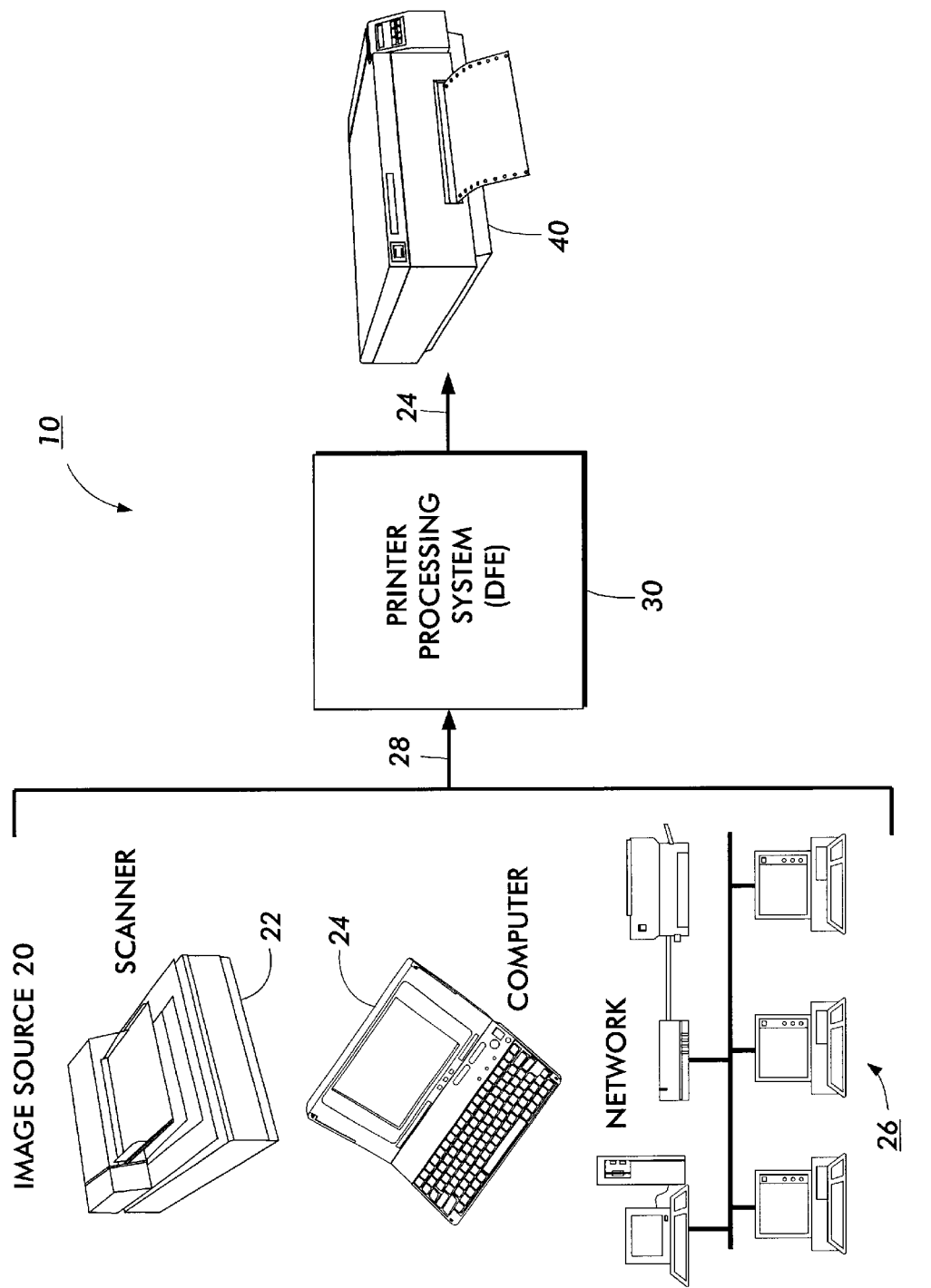
FIG. 1 is a general representation of a suitable system-level embodiment for one or more aspects of the present invention.

The following will be a detailed description of the drawings which are given for purposes of illustrating the preferred embodiments of the present invention, and not for purposes of limiting the same. In this description, as well as in the drawings, like reference numbers represent like devices, circuits, or circuits performing equivalent functions.

Turning now to FIG. 1, there is shown a diagram of an embodiment of a digital printing system 10 incorporating features of the present invention. Printing system 10 includes image source 20 which may include scanner 22, computer 24, network 26 or any similar or equivalent image input terminal to generate digital image data 28 that is supplied to image processing system 30 which may include what is known in the art as a digital front end (DFE). Image processing system 30 receives digital image data 28, which may include any combination of bitmapped data, grayscale or continuous tone (contone) data, graphics primitives, page description language (PDL), etc, and transforms the digital image data into print ready data 32 for rendering on image output terminal (IOT) 40. In response to data 32, IOT 40 generates an output image on suitable media (e.g., print or display). IOT 40 is preferably an electrophotographic print engine; however, IOT 40 may include print engines employing equivalent marking process alternatives such as ink jet, ionographic, thermal, etc. Furthermore, image processing system 30 may be incorporated in electronic display systems such as CRTs, LCDs, LED, etc.

Figure 7:
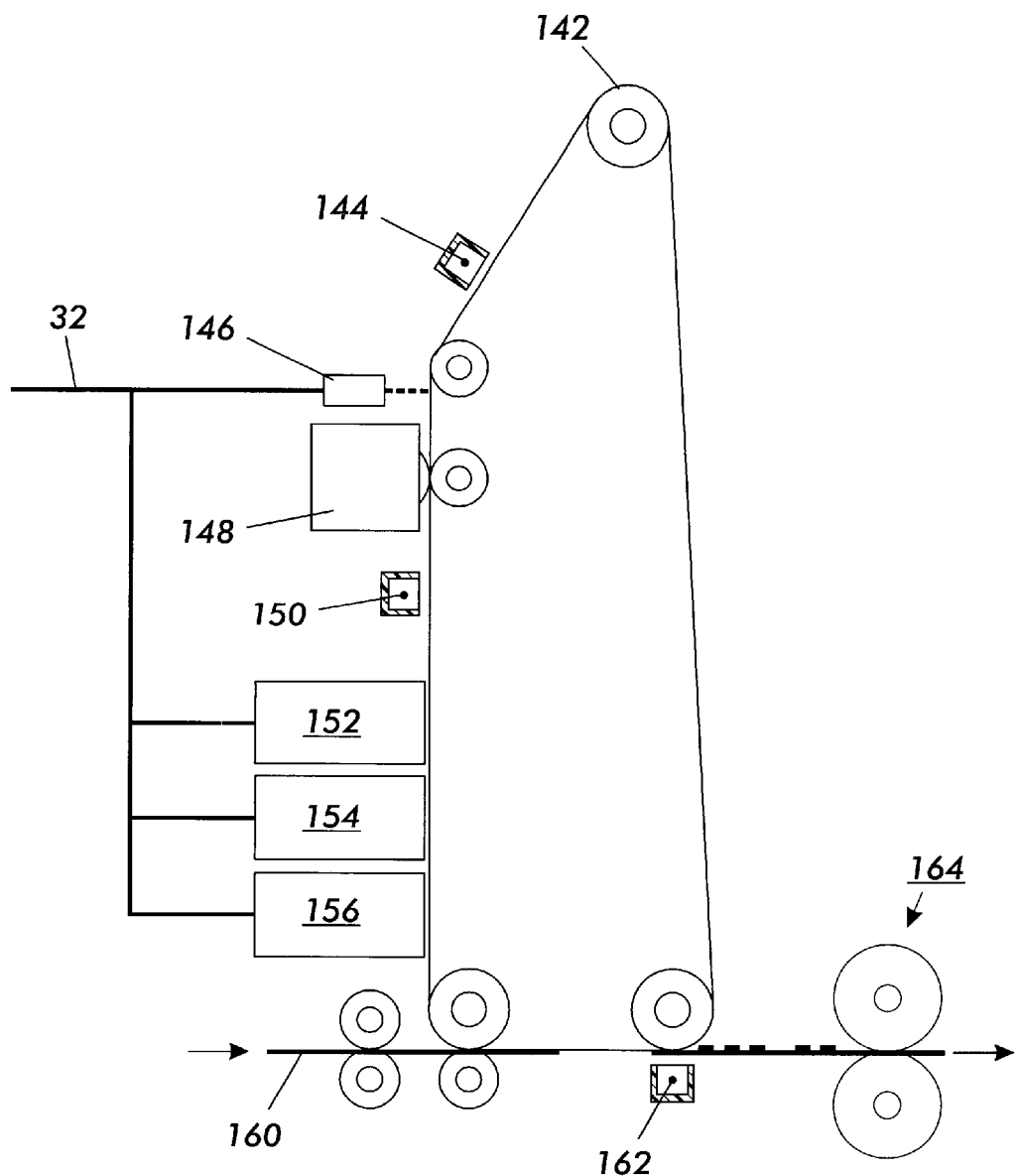
FIG. 7 is a partial schematic perspective view of a system suitable for use with one or more aspects of the present invention.

Referring to FIG. 7, shown is an embodiment of an electrophotographic print engine 40 that operates on the print ready data 32 to generate a color document in a single pass on a charge retentive surface in the form of photoreceptor belt 142. Initially, belt 142 passes through charging station 144, where the photoconductive surface of belt 142 is charged to a substantially uniform potential. Upon passing through charging station 144, the charged image area travels through a first exposure station 146. In response to print ready data 32, exposure station 146 generates modulated light beam that illuminates portions of the image area which causes the charge retentive surface to be discharged so as to create an electrostatic latent image.

After receiving an electrostatic latent image at exposure station 146, the exposed image area passes through a first development station 148 at which toner of a first color, say black, is placed on the latent image using commonly known techniques. After passing through development station 148, the now exposed and toned image area is recharged to a substantially uniform level at first recharging station 150. This same image area with its black toner layer is then exposed to a light image which represents a second color separation such as yellow and developed to produce a second color toner layer at station 152. This recharge, expose, and develop process may be repeated at stations 154 and 156 to generate toner images of different colors such as magenta and cyan. After development at station 156, sheet 160 is brought into contact with the surface of belt 142 at transfer station 162 wherein the developed image is transferred to the sheet. After transfer, sheet 160 is advanced to fusing station 164 wherein the toner is permanently affixed to the sheet.

The present invention is directed to an adaptive image enhancement filter that operates to transfer received image data into enhanced image data for output on tangible media. The adaptive image enhancement filter includes a template matching module for comparing an observed pixel pattern comprising a target pixel and one or more neighboring pixels to a set of templates to determine if the observed pixel pattern matches any of the templates. The template matching module generates a match identifier signal indicating which template or templates, if any, the observed pixel pattern is found to match. Based on this match identifier, a signal generation module provides an enhanced output signal for the target pixel. The template matching and/or the signal generation modules can be independently modified to adapt to changing conditions such as changes in the nature or type of the received image data, changes in the nature of the output signals, changes to the marking process and/or changes in the characteristics of the marking process or marking engine. Although characterized herein as occurring in IOT 40, those skilled in the art will recognize an adaptive image enhancement filter may reside within the DFE, the IOT, or within a separate component or in any combination thereof. Furthermore, it will be appreciated that the adaptive image enhancement filter can comprise hardware, software, firmware as well as any combination thereof.

Figure 2:
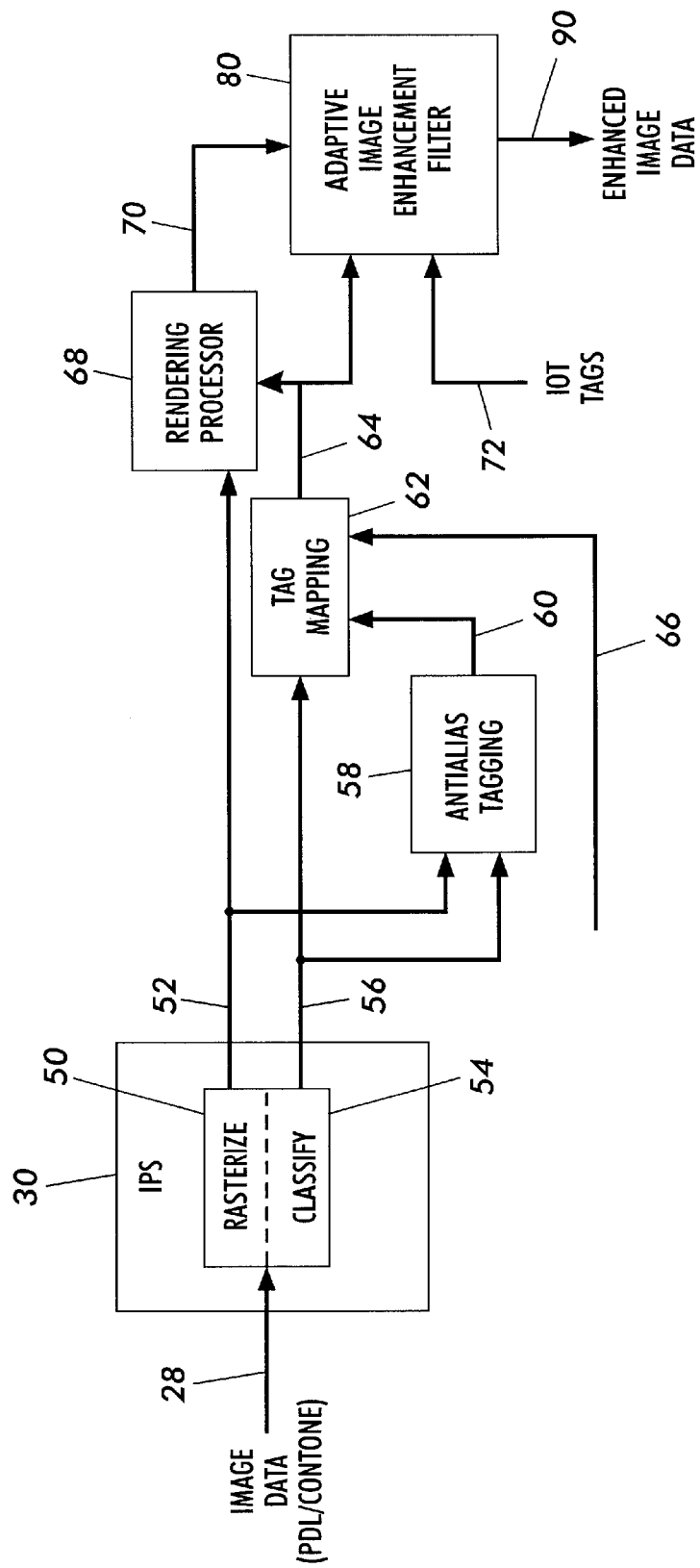
FIG. 2 is a block diagram illustrating a generalized data flow through one embodiment of the present invention.

Turning now to FIG. 2, image processing system 30 receives unprocessed image data 28 which may comprise any combination of grayscale data, ASCII text characters, graphic primitives (e.g., geometric shapes in a mathematical format with definitions for pattern, fill type, arcs, etc., together with border locations, thickness, titles and the like), a high level graphics language such as PostScript®, etc. In the course of processing the image, including other processes (not shown) that operate on image data 28, DFE 30 preferably includes a rasterization operation 50 wherein the image data is decomposed into raster image data 52 comprising a two dimensional array of multibit pixels representing the image to be printed. Such rasterization processing can be accomplished in any of a variety of conventional manners known in the art.

Beneficially, DFE 30 further includes an image classification operation 54 which identifies the image type of an individual pixel or group of pixels such as a defined object or image segment within the image data and generates classification tags 56 indicative thereof. That is, each classification tag 56 provides an indication of or hints to the image type of the corresponding image segment. An image segment may comprise either an individual pixel or a defined group of pixels. Tags 56 may, for example, simply operate to identify the image type (e.g., line art, text, pictorial, halftone, antialiased, etc.) of the corresponding data segments. However, it should be apparent that classification tags 56 may provide further information or identify additional characteristics such as smooth contone, rough contone, text on tint, halftone frequencies (e.g., high, mid or low) etc. Moreover, it should be appreciated that as opposed to providing information about or identifying characteristics of the corresponding data segment, tags 56 may suggest, request, identify or denote a processing action or option to be performed in subsequent operations. Such a distinction can be important as two different object types could call for the same rendering action.

Those skilled in the art will recognize that there are numerous approaches available for identifying an image type. For example, in some instances the type of data and/or the format of the data may be used to identify the image type. That is, grayscale image data often corresponds to pictorial images, while text may be formatted as bit-mapped data or ASCII text characters. Similarly, line art will often be formatted as bit-mapped data or graphics primitives such as geometric shapes in a mathematical format with definitions for pattern, fill type, arcs, etc., together with boarder locations, thickness, titles and the like. A similar analysis technique examines PDL data to identify specific codes present which are indicative of a particular language or image type.

It should be noted that, although unique image types often have unique data formats, grayscale image data may contain a variety of image types, particularly when the image data 28 comprises scanned image data. Thus, the image classification process may analyze grayscale image data using automatic image segmentation techniques to identify different image types within the image data and classify pixels accordingly. Image segmentation is well known in the art and generally uses any of a number of classification functions (e.g., auto-correlation, spatial frequency analysis, pattern or template matching, peak/valley detection, histograms, etc.) to analyze image data and classify image pixels as one of several possible image classes (e.g., pictorials, smooth contone, rough contone, text/line art, text on tint, halftones of various frequencies, etc.).

In addition to the classification operation above, image data 52 and tags 56 can be supplied, as indicated, to antialias tagging (AAT) processor 58. AAT processor 58 identifies those pixels within data 52 determined to be antialiased and generates tags 60 that identify antialiased pixels within image data 52 and provide hints as to the image structure of the antialiased pixel and/or identify subsequent processing operations. While the antialias tagging operation performed at processor 58 is optional, it should be appreciated that the operation can provide the added benefit of identifying objectionable artifacts that may not be detectable when the image data 28 is decomposed into raster image data. For example, tags 60 may identify the image structure associated with the antialiased pixel as being a left, right top or bottom edge, a split (e.g., a left edge near a closely spaced right edge), a fine line, a black edge on gray, etc. Tagging processor 58 can use tags 56 to provide further information regarding the image type to thereby to enable a more accurate determination of which pixels are antialiased pixels as well as the associated image structure. However, it should be noted that while tags 56 can be beneficial in the antialiased tagging operation they are not required. More details concerning antialiased tagging can be found in "Method to Enable the Recognition and Rendering of Antialiased Images," R. Loce et al., application Ser. No. 09/046,414; "Tagging of Antialiased Images," R. Loce et al., application Ser. No. 09/046,424; "Method for Generating Rendering Tags to Facilitate the Printing of Antialiased Images," P. Crean et al., application Ser. No. 09/046,232; and "Memory-Efficient Tagging of Antialiased Images," S. Harrington et al., application Ser. No. 09/046, 426 which are hereby incorporated by reference for their teachings.

Tags 60 are supplied to tag mapping module 62 wherein rendering tags 64 are generated by simply combining tags 56 with tags 60 and/or by mapping tags 56 and tags 60 to a new set of tags. It should be appreciated that tags 64 may be multiple-bit tags and various bits therein may be employed by the different processors receiving the tag data (e.g., rendering processor 68 may employ one set of tag bits whereas adaptive image enhancement filter 80 may utilize another set). Furthermore, as depicted in the FIG. 2, additional imaging characteristics, hints and/or options in the form of tag signal 66 may be supplied to mapping module 60 to be combined with tags 58 and/or 60 to yield rendering tags 64 that possess more information or more accurate information on a particular pixel and how it should be rendered. Tags 66, which may be obtained from user input of print characteristics or print options or generated by additional processing operations (not shown), may provide processing information such as resolution of image data 28, print quality (e.g., high, normal, draft), the type of print medium, rendering options (e.g., halftoning/screening method), reduction or enlargement options, image class and classification characteristics (e.g., pictorial, text, neutral), etc.

Rendering tags 64 are supplied to rendering processor 68 and adaptive image enhancement filter 80 to control the processing therein, as described below. As will be further appreciated when describing adaptive image enhancement filtering, rendering tags 64 are used to identify image attributes, and the information provided by rendering tags 64 may include, for example, pixel type (e.g., halftoned, antialiased, scanned), image class and classification characteristics (e.g., pictorials, smooth contone, rough contone, text/line art, text on tint, background, halftones of various frequencies, etc.), image structure, resolution of image data 28 and/or image data 52, halftone frequency, halftone/ screening method, printing (processing) options (such as a requested halftoning method error diffusion method).

Rendering processor 68 receives image data 52 and the associated rendering tags 64 and converts the pixels within the image data to processed image data 70. Since it is desirable to treat pixels differently depending upon the image type, processor 68 beneficially applies a rendering process optimized for the specific image type and/or image structure of each pixel as identified by, its associated rendering tag 64. For example, if rendering tag 64 identifies a pixel within image data 52 as being within a pictorial image, processor 68 subjects the pixel to a rendering operation (e.g., halftoning/screening, error diffusion) optimized for pictorial images. However, rendering text with a process optimized for pictorial images may introduce undesired artifacts such as distortion or blurring of the edges into the image. Thus, pixels identified as being text are subjected a rendering operation optimized for text images. Similarly, pixels identified as being antialiased or within graphic images may be processed with a rendering procedure optimized for the particular image type.

Processed image data 70, which may be single or multibit per pixel image data is supplied to adaptive image enhancement filter 80. Additionally, rendering tags 64 and image output terminal information signal (IOT tags) 72 are supplied to adaptive image enhancement filter 80. As described above, rendering tags 64 can be used to provide a wide range of information regarding the image attributes as well as information concerning how the pixel should be processed. IOT tags 72 provide information concerning the attributes of the marking process including characteristics or state of the marking engine. Such information may provide clues as to how an image will appear on the output media and thus have an impact on the signal used to drive the marking engine. For example, IOT tags 72 may identify the type of marking process used (e.g., inkjet or electrophotographic) as well as the nature and/or format of the image driving the marking process (e.g., 4x or 8x high addressability pixels, two-dimensional high addressable pixels, pulse width position modulation, etc.).

It should be appreciated that changes in the characteristics of the photoconductive surface onto which a latent image is generated such as might occur with aging of the photoconductive surface, process drift or changes in environmental conditions (e.g., temperature, humidity) may affect the charging and discharging characteristics of the photoconductive surface. These effects may impact the resulting latent and printed images. The IOT may periodically determine such characteristics and generate a tag signal indicative thereof. For example, image output terminal 40 may periodically generate calibration patches designed to identify changes in a latent or printed image. The calibration patches can be analyzed to identify any impact to the images and IOT tags 72 can be used to provide an indication of the impact. Moreover, IOT tags 72 can also be used to identify characteristics of the toner and paper/media with which an output document will be generated. A wide range of media types ranging from rough flat sheets to smooth, high gloss coated paper and transparencies exists. Each of these types has its own unique characteristics which in many instances affect toner coverage and output image thereby requiring very different image signals driving the marking engine, particularly for inkjet printing.

Figure 3:
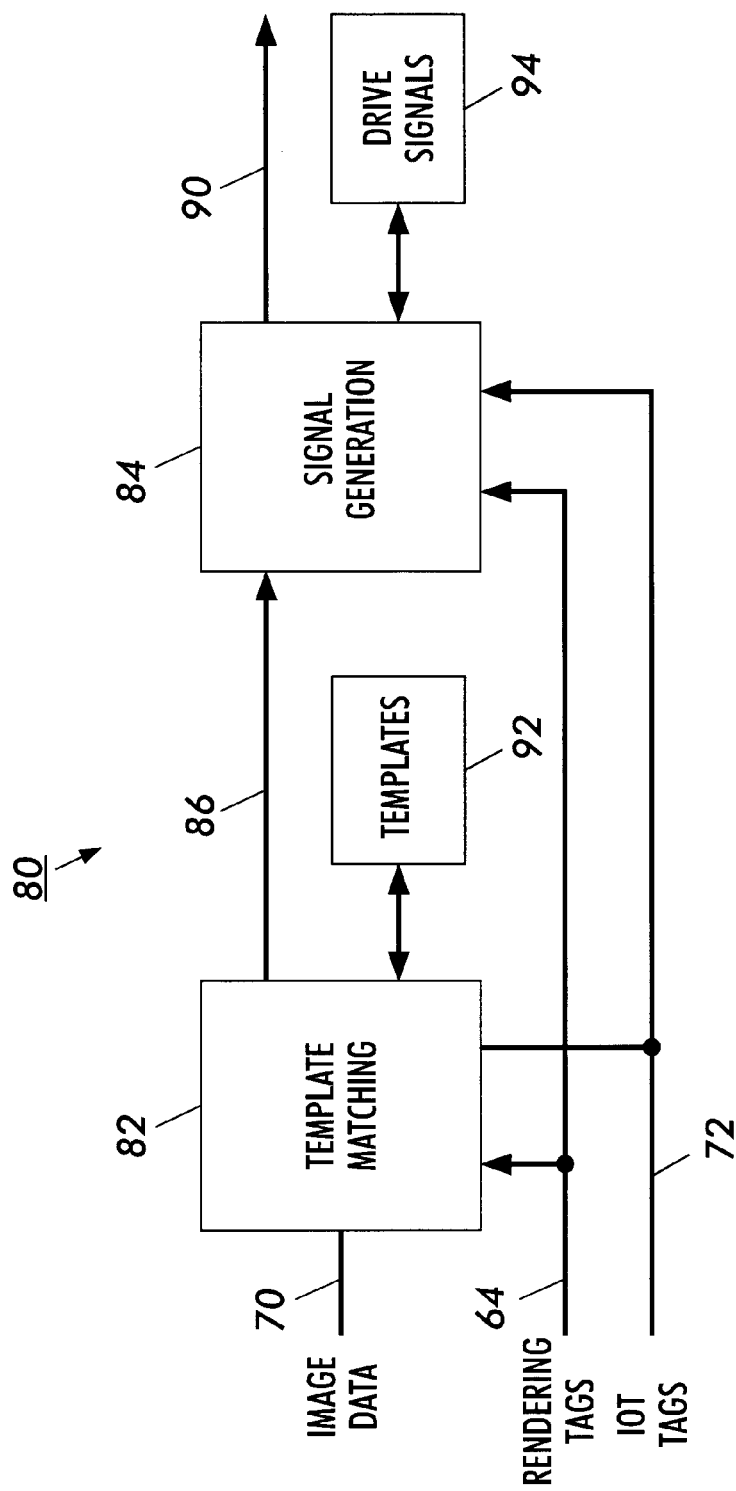
FIG. 3 is a block diagram of a circuit for an embodiment of an adaptive image enhancement filter according to the concepts of the present invention.

Adaptive image enhancement filter 80, responsive to rendering tags 64 and IOT tags 72, converts image data 70 into enhanced image data 90 for driving the marking engine to generate an output image on suitable media. More particularly, as shown in FIG. 3, image enhancement filter 80 includes template matching module 82 and signal generation module 84. Briefly, template matching module 82 compares groups of pixels within image data 70 to image patterns within a set of templates to identify how a given pixel relates to and/or interacts with neighboring pixels. Based upon this identification, signal generation module 84 generates enhanced print ready data for the given pixel which is optimized for the image pattern identified and the current conditions of the given marking process.

As depicted in FIG. 3, the embodiment of adaptive image enhancement filter incorporates the use of rendering tags 64 and IOT tags 72 at each module therein. Providing rendering tags 64 and IOT tags 72 to template matching module 82 and/or signal generation module 84 makes available further information to the modules and to enables a more accurate determination of the set of templates or enhanced print signals to use.

Image data 70, tags 64 and, optionally, tags 72 are supplied to template matching module 82. Adaptive image enhancement filter 80 may include an image buffer (not shown) for receiving and buffering several scanlines of the received image data and associated tags. Template matching module 82 identifies an arrangement of pixels from image data 70 defined by an observation window of predetermined size and shape delineating a set of observed pixels including a target pixel and one or more neighboring pixels. Template matching module 82 compares the observed pixel pattern to a set of templates to determine if the observed pixel pattern matches any of the templates within the set.

Figure 4:
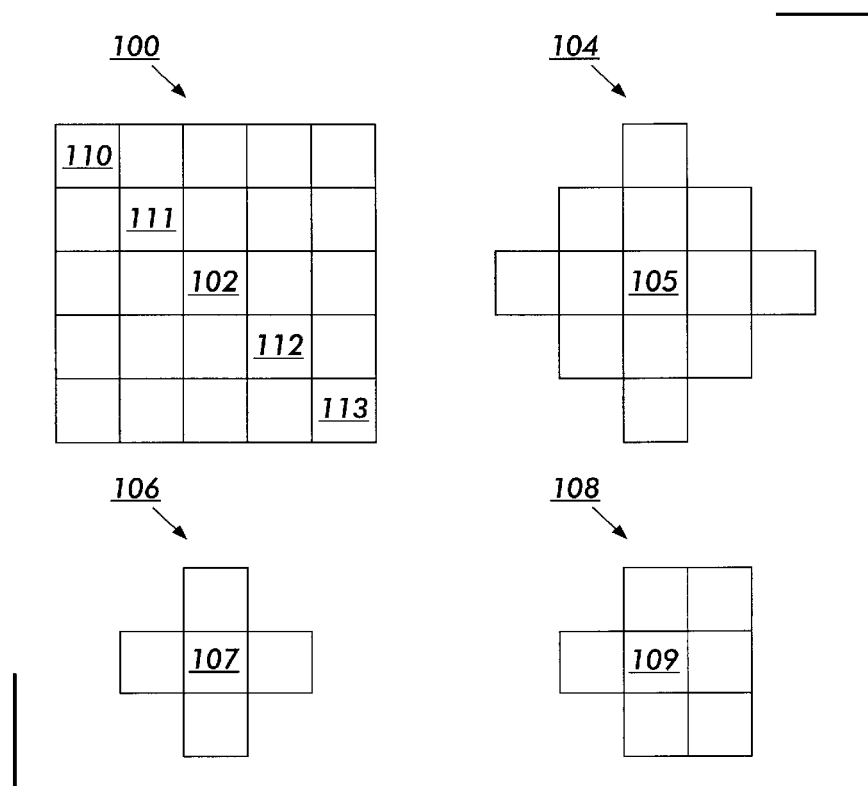
FIG. 4 shows several examples of observation windows suitable for use with a template matching operation.

The observation window defining the observed pixel pattern may comprise a square (e.g., 3×3 or 5×5) window centered on the target pixel, such as the 5×5 window 100 centered on target pixel 102 illustrated in FIG. 4. It should be appreciated that the size and shape of the observation window may be varied and that the observation window need not be centered on the target pixel. Illustrative examples of other commonly used windows shown in FIG. 4 include a "diamond" window 104 centered on target pixel 105, a "plus" window 106 centered on target pixel 107 and an "offset" window 108 including target pixel 109. Furthermore, as will be appreciated by those skilled in the art, the observation window may comprise one or more lines of pixels which may be processed as a vector of pixels. Processing a vector, as opposed to a window, may reduce the time and memory resources required. One example of a set of pixels within window 100 that comprises a vector includes pixels 110–114 along with target pixel 102. It should be appreciated that a variety of vectors are suitable for use with an adaptive image enhancement filter in accordance with the present invention including horizontal, vertical and diagonal lines about a target pixel.

Template matching module 82 is responsive to tags 64 and/or tags 72 to identify and retrieve a set of templates to which the observed pixel pattern is compared from a collection of templates 92. The collection of templates .92 beneficially comprises a plurality of template sets which each template set optimized for given grouping of image and marking process attributes. The collection of templates 92 can be located in any conventional storage device accessible to the template matching module. It should be apparent that template matching module 82 may use the tags to identify a set of templates and, rather that retrieving a set of templates from memory, simply identify a address or an offset with which the template set to be compared can be accessed.

Conventionally, the templates within a set are determined by identifying which image structures should be enhanced. The image structures to be enhanced may vary for different attributes such as image resolution, font size, local feature size, image class (e.g., scanned halftone, text, line art, pictorial, etc.). Template matching module 82 selects the set of templates that is best suited for the specific image attributes defined by tags 64 and the marking process attributes identified by IOT tags 72. In addition to the image attributes and marking attributes defined above, templates may be created to compensate for a variety of marking process attributes including, but not limited to, reproduction of line width and density, corner reproduction, jaggie reproduction, overlay printing, output maximum density, lead edge and trail edge performance and noise characteristics.

More specifically, concerning reproduction of line width and density, modeling and/or analysis of the marking process may be used to identify those line widths which may need compensation to ensure accurate reproduction as well as provide an indication as to how to compensate for such structures. For example, the fine lines that occur in Kanji characters may need compensation to ensure accurate reproduction of the characters. Templates designed to identify the line widths or image structures in need of compensation can be included. Similarly, with respect to corner reproduction, inside and/or outside corners may require compensation depending on the marking process to ensure reproduction of sharp corners. If so, templates designed to identify the specific corner structures to be enhanced can be included. More information on template matching for sharpening corner structures can be found in commonly assigned, U.S. patent application Ser. No. 09/579,089 entitled "Image Processing Method for Sharpening Corners of Text and Line Art."

With respect to jaggie reproduction, jagged edges may appear on digitized angled edges of lines, including text and line art, depending upon the marking process and its characteristics. Templates to identify the lines that require enhancement to remove the jagged edges may be included. Overlay printing relates to trapping operations. Specifically, in color plane to color plane trapping, the edges of objects in different color planes are grown to overlay in a manner that is compatible with the marking characteristics and color plane registration. Templates involved in objects with color-to-color characteristics can be included in a manner that depends on color-to-color marking characteristics, which includes image registration.

Referring to output maximum density, when printing solid areas larger than a threshold size, full exposure may result in too much toner or ink being deposited which can result in mottle and density variations in the solid areas. Templates designed to identify the solid area coverage and compensate such as by stripping out selected pixels in solid areas can be included. Lead edge performance and trail edge performance issues refer to edge delineation and placement problems that manifest as line shrinkage, halo and white gap artifacts. The marking process may vary its responsiveness to lead and trail edges leading to the above problems which are sometimes referred to as "slow toner." Templates designed to distinguish edges of concern including lead and trailing edges as well as edges at other orientations can be incorporated to ensure such edges are properly marked. To compensate for noise characteristics wherein certain sensitive image features (e,g, small, uniform, . . . ) need to be modified based on the present state of spatial nonuniformity or uniformity from one print to the next, templates can be included to recognize those sensitive features.

For each of the marking process attributes discussed above, modeling and/or analysis of the print engine response can be used to identify the image structures which may require modifying the image data and/or modifying of how the image is rendered to ensure accurate reproduction. Having identified the image structures, templates can be designed to identify those image structures in given settings (i.e., for selected combinations of image and marking process attributes).

Since it is possible that all the pixels within the observed pattern may not have the same tag values (i.e., have different image attributes), template matching module 82 determines a representative tag for the observed pixel pattern. Template matching module 82 may simply use tag 64 associated with the target pixel as the representative tag or may generate a representative tag as a function (e.g., rule based, a weighted count, etc.) of the tags for each pixel within the observed pixel pattern.

Having identified the optimized template set, template matching module 82 compares the pixel pattern defined by the observation window to the templates within the optimized set of templates to determine if the observed pixel pattern matches any of the templates. Template matching module 82 generates an output signal (match identifier 86) indicating which template or templates, if any, the observed pixel pattern is found to match.

Figure 5:
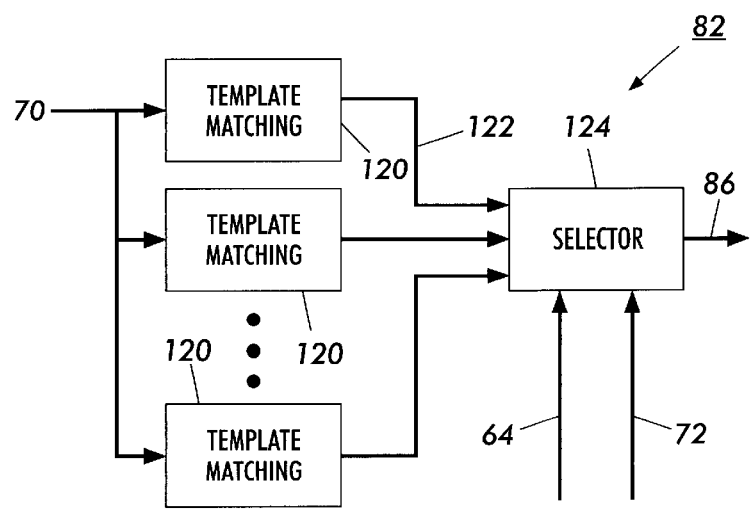
FIG. 5 shows an embodiment of a template matching module suitable for use in an adaptive image enhancement filter of the present invention.

As an alternative to identifying and retrieving the templates from a template set, template matching module 82 may include a plurality of template matching operations arranged in parallel as is shown in FIG. 5. In the embodiment of FIG. 5, image data 70 is supplied to each one of a plurality of template matching processors 120. Each processor 120 performs template matching operations using a template that is adapted for given image type(s) and marking process characteristics, to generate match identifier 122. A selector 124 uses information provided by tags 64 and 72 to control the selection of match identifier 122, and to provide match identifier 86 to the signal generation module.

Referring, again, to FIG. 3, match identifier 86 is supplied to signal generation module 84 which, in response to the match identifier, generates enhanced image data 90 for the target pixel. In the present example, enhanced image data 90 represents the optimized image data for driving the marking engine to reproduce the image given the target pixel value and the identified image pattern. As described above the attributes of the marking process may impact the resulting latent and printed images and influence the signal used to drive the marking engine. For example, the enhanced output signals employed to render high addressability pixels have an effect within the output image that may be thought of as the amount darkness generated, the resulting shift in an edge, the resulting line thickness, or the resulting pixel density. The possible output signals must be calibrated so as to characterize the effect they generate.

The calibration can be performed for a variety of different settings wherein each setting corresponds to a defined set of marking process characteristics and/or image characteristics. Then knowing the effect, a given signal can be used in the most appropriate setting.

The calibration process can be performed for a variety of possible states, with each state corresponding to a defined set of attributes for the image data and/or the marking process. Each state calibrated then forms a set of optimized signals for driving the marking engine from which the enhanced image data is derived. As IOT tags 72 provide attributes of the marking process and rendering tags 64 identify image attributes, the tags can be used to select the appropriate set of enhanced image data for driving the marking engine that is optimized for the attributes of the image data and/or the existing marking process.

Signal generation module 84 is responsive to tags 72 and/or tags 64 to identify and select a set of drive signals from a collection of optimized drive signals 94 from which the enhanced image data is derived. The collection of optimized drive signals 94 beneficially comprises a plurality of sets of drive signals with each set of drive signals comprising a plurality of enhanced drive signals optimized for drive the marking engine. The collection of optimized drive signals 94 can be located in any conventional storage device accessible to the module. Signal generation module 84 selects the set of drive signals that is best suited for the specific image attributes defined by IOT tags 72 and/or rendering tags 64. In addition to the marking process attributes described above, IOT tags 72 may provide information concerning marking engine responsiveness to small high addressable events (e.g., 1/8 pixels), change in responsiveness in terms of output density and/or output width, or an output characteristic like toner spreading, mottle, graininess, tone reproduction curve, etc. Signal generation module 84 may use any attribute or combination of image and marking process attributes as described above that are identified by tags 72 and/or tags 64 to select the set of drive signals from the collection of optimized drive signals 94.

Having selected the set of drive signals from the collection, signal generation module generates enhanced image data 90 using the optimized signals. Beneficially, each set of optimized drive signals comprises a lookup table with each entry within the table containing an enhanced output signal optimized for the current IOT and/or image attributes identified by tags 72 and 64. Thus, match identifier 86 can be thought of as an index into a lookup table comprising the possible values of enhanced image data for driving a given marking engine.

As an alternative to identifying and retrieving a set drive signals for each pixel within the image, signal generation module 84 may, similar to that shown in FIG. 5 for the template matching module, include a plurality of signal generation operations arranged in parallel. Each signal generation operation receives the match identifier from template matching module and generates an enhanced output signal supplied to a selector such as a multiplexer or the like. The selector is responsive to tags 72 and/or 64 to control the selection of the enhanced output provided as the enhanced image data.

Figure 6:
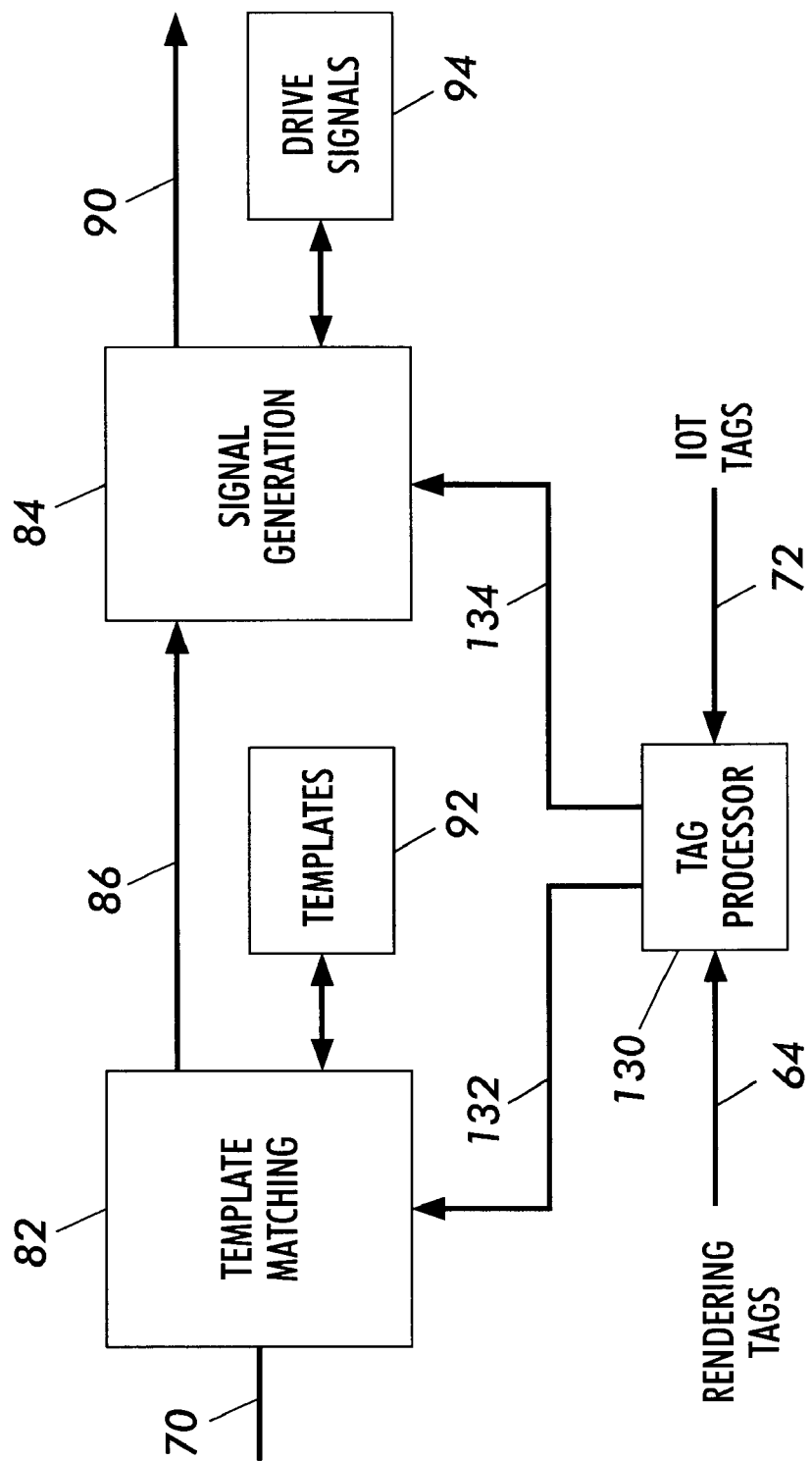
FIG. 6 shows an embodiment of an adaptive image enhancement filter.

Turning now to FIG. 6, there is shown an alternative embodiment of an adaptive image enhancement filter 80. The adaptive image enhancement filter of FIG. 6, receives rendering tags 64 and IOT tags 72 which provide hints as to the image attributes and the attributes of the marking process, respectively,, at tag processor 130. In response to tags 64 and 72, tag processor 130 generates a template select signal 132 and a driver select signal 134. That is, based upon the image attributes and/or IOT attributes, tag processor 130 generates template select signal 132 identifying the template set to which the observed pixel pattern is to be compared that is best suited for the specific image attributes defined :by tags 64 and the marking process attributes identified by IOT tags 72. Similarly, based upon tags 72 and/or tags 64, processor 130 generates driver select signal 134 identifying the set of drive signals that is best suited for the specific attributes identified by the tags. The template select signal 132 is supplied to template matching module 82, and driver select signal 134 is supplied to signal generation module 84.

It should be appreciated that the operation of rendering processor 68 and image enhancement filter 80 can be beneficially combined into a single module that performs both operations simultaneously. For example, enhancement filter 80 may operate to render contone or multilevel image data 52 to an enhanced 8X high addressable pixel state for driving the IOT. In one possible implementation of the above, the template matching operation receives image data 52 and identifies a match indicator that can be thought of as identifying the fill, order (e.g., center, left, right, split, etc.) and gray level of the 8X high addressable pixel. The signal generation operation provides the enhanced 8X high addressable pixel (i.e., position and number of activated high addressable bits) driving the IOT wherein the enhancement may be considered as compensating for the marking process characteristics to derive optimal number and position of activated high addressable bits.

In summary, there has been disclosed an adaptive image enhancement filter includes a template matching module for comparing an observed pixel pattern comprising a target pixel and one or more neighboring pixels to a set of templates to determine if the observed pixel pattern matches any of the templates. The template matching module generates a match identifier signal indicating which template or templates, if any, the observed pixel pattern is found to match. Based on this match identifier, a signal generation module provides an enhanced output signal for the target pixel. The template matching and/or the signal generation modules can be independently modified to adapt to changing conditions such as changes in the nature or type of the received image data, changes in the nature of the output signals, changes to the marking process and/or changes in the characteristics of the marking process or marking engine.

Separating the template matching and signal generation operations allows for easy modification of the filter as required for changes in the input image data or in the marking process. That is, as a marking process matures the adaptive image enhancement filter can be easily modified to include different sets of templates and/or different sets of optimized signals by loading the sets into the appropriate storage location. For example, a change in the photoreceptor used as well as the change in the output resolution can be managed by loading new sets of optimized signals into the collection of optimized signals. Furthermore, the use of templates optimized for specific image characteristics or classes increases flexibility in template design and improves image quality for areas having diverse processing needs. Specific templates and/or enhanced output signals can be designed for processing stochastic screens, line screens, line art, kanji, etc without compromising image quality by having to suit a variety of conditions.

While the present invention has been described with reference to various embodiments disclosed herein, it is not to be confined to the details set forth above, but it is intended to cover such modifications or changes as made within the scope of the attached claims.

What is claimed is:

1. An adaptive image enhancement filter for receiving image data including a plurality of pixels and generating enhanced image data for driving a marking engine for each pixel within the image data, comprising:

a template matching processor receiving an observation pattern including a target pixel and at least one pixel neighboring the target pixel, the template matching module comparing the observation pattern to a set of templates and generating a match identification signal; and a signal generation processor connected to receive the match identification signal and a marking process attribute signal, the signal generation processor including a plurality of sets of optimized signals, each set of optimized signals containing a plurality enhanced signals for driving the marking engine, the signal generation processor identifying one of the sets of optimized signals in response to the marking engine attribute signal and providing in response to the received match identification an enhanced signal from the identified set of optimized signals signal as enhanced image data for the target pixel.

2. The adaptive image enhancement filter of claim 1, wherein the marking process attribute signal identifies at least one of the attributes including type of marking process, nature of the marking process, identification of the photoreceptor, reproduction of line width and density, corner reproduction, jaggie reproduction, overlay printing, output maximum density, lead edge and trail edge performance characteristics, responsiveness to small high addressable events, and change in responsiveness in terms of output density.

3. The adaptive image enhancement filter of claim 1, wherein the signal generation processor is further responsive to an image attribute signal when identifying one of the sets of optimized signals.

4. The adaptive image enhancement filter of claim 1, wherein each set of optimized signals comprises a lookup table.

5. The adaptive image enhancement filter of claim 1, wherein:

the signal generation processor further includes a selection processor; and each set of optimized signals receives the match identification signal and provides a corresponding enhanced signal to the selection processor.

6. The adaptive image enhancement filter of claim 1, further comprising a template storage device storing a plurality of template sets, each template set including a plurality of templates wherein each template is designed to identify a specific image structure to be enhanced; and wherein the template matching processor is further responsive to at least one of an image attribute signal and a marking process attribute signal to identify one of the plurality of template sets to which the received observation pattern is compared.

7. The adaptive image enhancement filter of claim 6, wherein the image attribute signal identifies at least one of the attributes including image resolution, pixel type and image classification.

8. The adaptive image enhancement filter of claim 6, wherein the template matching processor is responsive to at least one of the attributes including image resolution, pixel type, image classification, reproduction of line width and density, corner reproduction, jaggie reproduction, overlay printing, output maximum density, lead edge and trail edge performance and noise characteristics.

9. A method of generating enhanced image data for driving a marking engine, comprising:
- receiving a set of pixels to be printed, the set of pixels including an observation window identifying a target pixel and at least one neighboring pixel;
- comparing the pixels within the observation window to a set of pixel templates;
- generating a template match identifier in response to the comparing step;
- selecting one of a plurality of sets of optimized drive signals, each set of optimized drive signals containing a plurality enhanced signals for driving the marking engine; and
- using the match identifier select one of enhanced signals from the selected set of optimized drive signals as the enhanced image data.

10. The method of claim 9, further comprising receiving a marking process attribute signal; wherein the step of selecting one of a plurality of sets of optimized drive signals is in response to the marking process attribute signal.

11. The method of claim 10, further comprising receiving an image attribute signal.

12. The method of claim 11, wherein the step of selecting one of a plurality of sets of optimized drive signals is further responsive to the image attribute signal.

13. The method of claim 11, further comprising:
- selecting the set of pixel templates from a plurality of template sets based on the image attribute signal.

14. The method of claim 9, further comprising:
- receiving an image attribute signal; and
- selecting the set of pixel templates from a plurality of template sets based on the image attribute signal.

15. The method of claim 9, wherein the step of selecting one of a plurality of sets of optimized drive signals selects a set that compensates for a marking process characteristic.

16. The method of claim 15, wherein the step of selecting one of a plurality of sets of optimized drive signals compensates for at least one characteristic from the set of attributes including type of marking process, nature of the marking process, identification of the photoreceptor, reproduction of line width and density, output maximum density, lead edge and trail edge performance characteristics, responsiveness to small high addressable events, a change in responsiveness in output density and a change in responsiveness in output width.

* * * * *